(No Model.) 2 Sheets—Sheet 2.

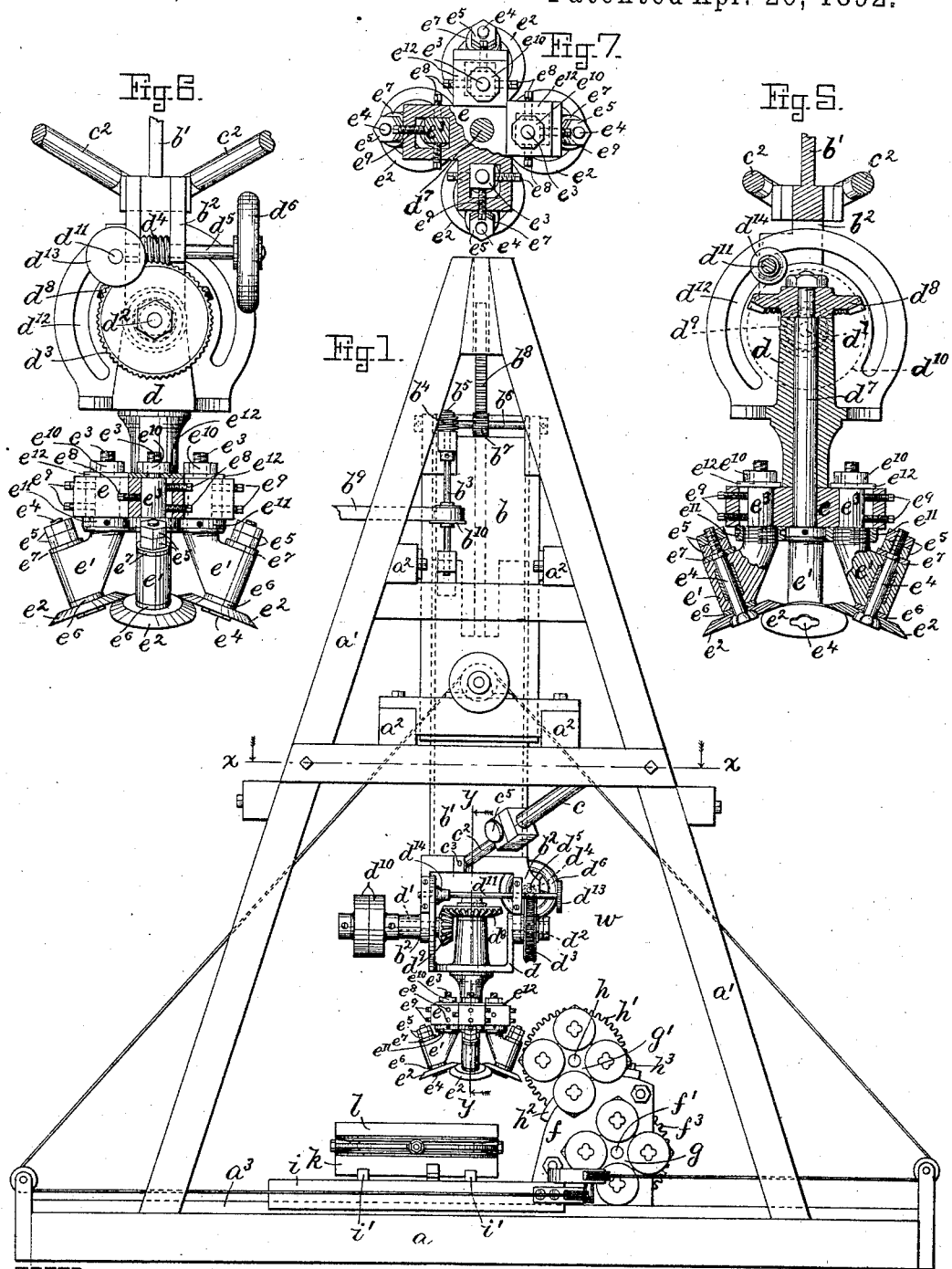

A. McDONALD.
MACHINE FOR CUTTING AND DRESSING STONE.

No. 473,850. Patented Apr. 26, 1892.

Witnesses  Inventor

Alexander McDonald

UNITED STATES PATENT OFFICE.

ALEXANDER McDONALD, OF CAMBRIDGE, MASSACHUSETTS.

MACHINE FOR CUTTING AND DRESSING STONE.

SPECIFICATION forming part of Letters Patent No. 473,850, dated April 26, 1892.

Application filed May 9, 1891. Serial No. 392,237. (No model.)

*To all whom it may concern:*

Be it known that I, ALEXANDER MCDONALD, of Cambridge, county of Middlesex, State of Massachusetts, have invented certain new and useful Improvements in Machinery for Cutting and Dressing Stone, of which the following is a specification.

My invention embodies improvements on prior Letters Patent of the United States granted to me, numbered 222,194, 262,237, and 307,865, and relates to a device for cutting and dressing the top of a stone and cutting moldings in the stone, consisting in a rotary chuck adjustable to the inclination required to cut a desired molding, said chuck being provided with adjustable cutters free to turn in contact with the stone.

The invention relates, further, to adjustable telescopic braces provided to brace the plate carrying the stone-cutting chuck.

The invention relates, further, to an improved chuck simpler in construction, more compact, and cheaper to make than mechanism of this class shown and described in my said prior Letters Patent.

The invention relates, also, to a device for cutting and dressing the side of a stone, consisting in two oppositely-rotating chucks with shafts in parallel bearings and provided with adjustable cutters free to turn in contact with the stone, the shaft of one of said chucks being so adjustable endwise in its bearings that this chuck may be advanced beyond the other chuck, if desired, in order that the two chucks may cut the stone on parallel planes, and one of said chucks being adjustable concentrically with the other chuck, in order that when a stone thin in vertical section is to be cut the two chucks may act upon the stone to a common point, the one cutting up and the other down, to obviate the fault occasioned by a single chuck acting upon a thin stone of leaving the stone ragged at the edge opposite to the edge at which the cutters enter.

Figure 4:
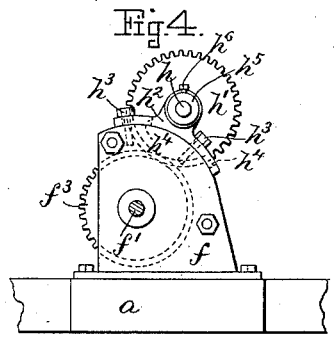
Figure 3:
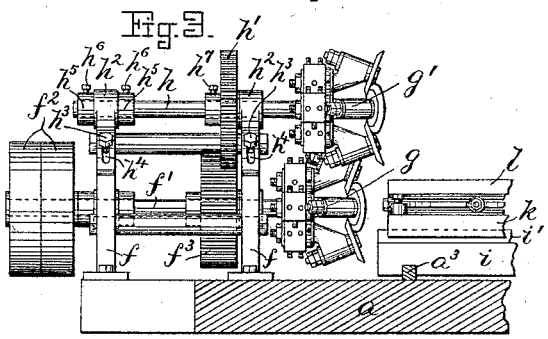
Figure 2:
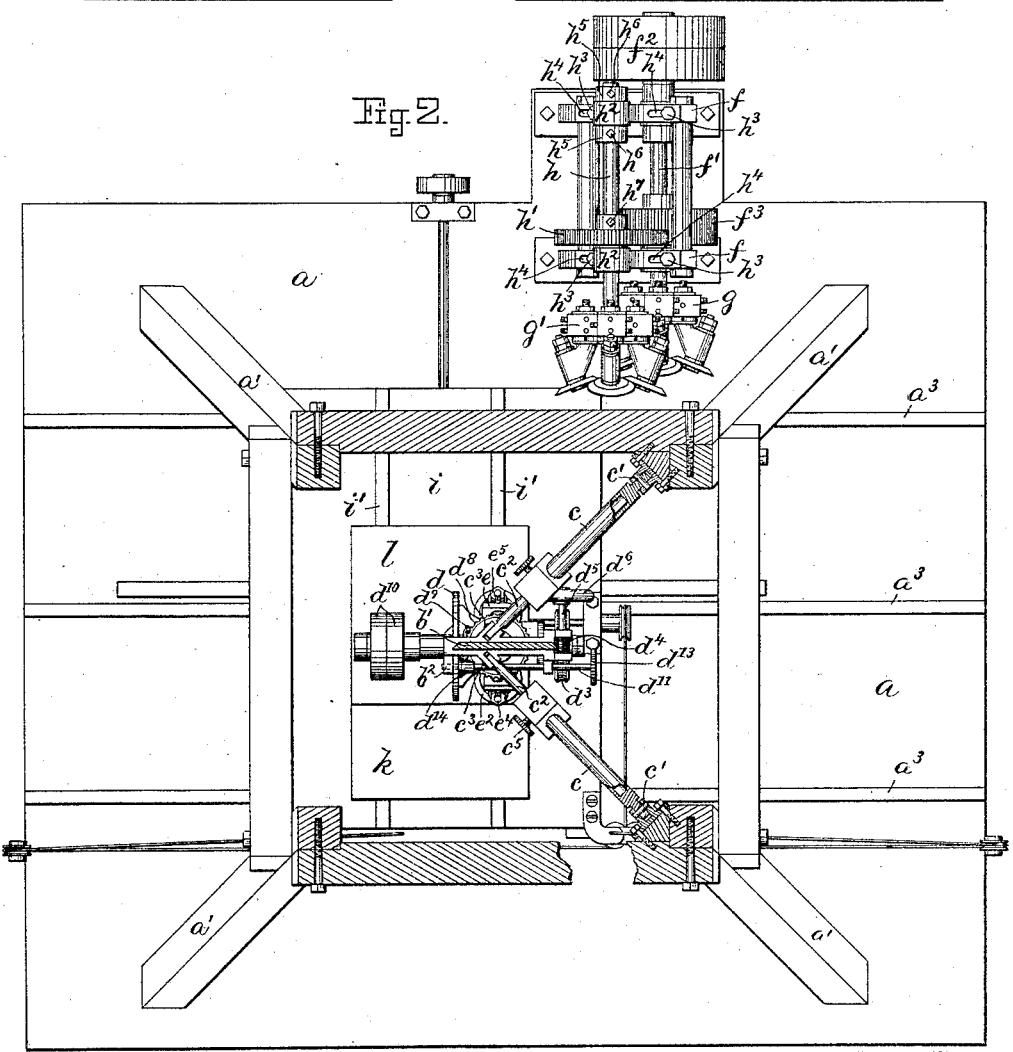
Figures 8, 9:
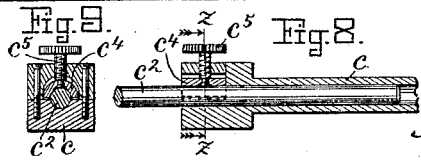

In the drawings, Figure 1 is a front elevation of the machine, showing both the top-cutting and side-cutting devices. Fig. 2 is a horizontal section on the line $x\ x$ of Fig. 1. Fig. 3 is a detail side elevation of the side-cutting device. Fig. 4 is a rear elevation of the side-cutting device, the driving-pulley removed. Fig. 5 is a vertical detail section on the line $y\ y$ of Fig. 1. Fig. 6 is a sectional side elevation of the top-cutting device seen from $w$ of Fig. 1. Fig. 7 is a detail sectional plan view of one of the rotary chucks. Fig. 8 is a detail longitudinal section of the adjusting mechanism of the braces. Fig. 9 is a cross-section of the adjusting mechanism on the line $z\ z$ of Fig. 8.

The machine is provided with the bed $a$, upon which is mounted the supporting-frame $a'$ of the device for cutting the top of the stone. To the supporting-frame $a'$, by means of the cross-bars $a^2$, is attached the grooved guide $b$, within which is guided up and down the movable plate $b'$, by means of the vertical shaft $b^3$, worm $b^4$, worm-wheel $b^5$, horizontal shaft $b^6$, pinion $b^7$, and rack $b^8$, attached to the movable plate $b'$, the shaft $b^3$ being operated by the belt $b^9$ and pulley $b^{10}$ to raise and lower said movable plate. The movable plate $b'$, when in position, is braced by means of adjustable telescopic braces pivotally attached at their opposite ends to the frame $a'$ and the movable plate $b'$. These braces consist of a tubular portion $c$, pivotally attached to the frame at $c'$, into which tubular portion passes the rod $c^2$, as shown, pivoted at $c^3$ to the movable plate $b'$. The unpivoted end of the tubular portion $c$ of the brace is provided with an internal clamping-plate $c^4$ and a set-screw $c^5$, whereby the rod $c^2$ and the tubular portion $c$ may be rigidly clamped together when the movable plate is in the desired position.

From the lower end of the movable plate $b'$ is pivotally hung the chuck-carrying frame $d$ on the shaft $d^2$ and sleeve of the shaft $d'$, mounted in the hangers $b^2$ of the movable plate $b'$, as shown. The shaft $d'$ has a bearing in the chuck-carrying frame $d$, while the shaft $d^2$ is rigidly attached to the chuck-carrying frame and is provided with the worm-wheel $d^3$, operated by means of the worm $d^4$, attached to the shaft $d^5$, which is mounted in bearings in the hanger on the movable plate $b'$, as shown, the shaft being operated by the hand-wheel $d^6$. The effect of turning the hand-wheel $d^6$ is to swing the chuck-carrying frame $d$ and its chuck and adjust the chuck to the desired inclination. Passing loosely through the circular slot $d^{12}$ in the chuck-carrying frame $d$ and screwing into the hanger $d^2$, as shown, is the rod $d^{11}$, which has a bearing in the opposite hanger and is provided at its outer end with a hand-wheel $d^{13}$ and at its clamping end with a fixed collar $d^{14}$, whereby the frame and hanger may be firmly clamped together and securely hold the chuck at the inclination to which it is adjusted. Rotary motion is given to the chuck through its shaft $d^7$, mounted in a bearing in the chuck-carrying frame $d$, as shown, by means of the bevel-gear $d^8$, which meshes into the bevel-pinion $d^9$, mounted on the shaft $d'$, provided with fast and loose pulleys $d^{10}$.

The adjustment above described of the chuck is obviously applicable to any rotary chuck provided with adjustable cutters rotating with the chuck, and also free to turn in contact with the stone, as well as to my improved chuck, herein next described.

To the lower end of the shaft $d^7$ is attached the rotary stone cutting or molding chuck, consisting, essentially, of the body portion $e$, the adjustable cutter-heads $e'$, consisting of the head $e'$ and its arm $e^3$, rigidly united, (in the drawings shown formed in one piece,) and the cutters $e^2$. The body $e$ of the chuck is provided with angular holes—in the drawings square holes are shown—within which are placed the arms $e^3$ of the cutter-heads $e'$. In each cutter-head $e'$ is supported a cutter-spindle $e^4$, which is free to turn in its bearing in the cutter-head and carries with it its cutter $e^2$, made fast to the spindle, as shown. Each spindle $e^4$ is screw-threaded on its upper end and is there provided with a suitable nut and check-nut $e^5$, and a suitable washer $e^6$ on the spindle $e^4$ is interposed between the cutter and cutter-heads, and a suitable washer $e^7$ is mounted upon a squared portion of the spindle between the cutter-head and nut and check-nut.

Each cutter-head is adjustable by means of set-screws $e^8$, passing through screw-threaded perforations in the opposite side of one of the angular holes in the body of the chuck and bearing against the arm of the cutter-head, and by means of the set-screws $e^9$, which pass through screw-threaded perforations in the outer side of the angular hole and bear against the arm of the cutter-head, and by placing a suitable wedge (not shown) between the arm and the inner surface of the angular hole, and each cutter-head is adjustable up and down by means of a nut $e^{10}$, mounted upon the screw-threaded end of the arm $e^3$ of the cutter-head above the body of the chuck, and a nut or collar $e^{11}$, mounted upon the screw-threaded portion of the cutter-head below the body of the chuck. A suitable washer or plate $e^{12}$ on the arm $e^3$ of the cutter-head is interposed between the nut $e^{10}$ and the body of the chuck, whereby the cutters carried by the cutter-heads may be adjusted to the proper relative positions to cut in the same plane and on the same circumference, each arm $e^3$ serving also to keep the axis of the cutter carried by the cutter-head united to such arm at an angle to the axis of the chuck, whereby, in connection therewith of the proper adjusting devices, the cutter may be presented to the stone at a cutting-angle.

The chucks of the device for cutting the side of the stone, $g$ and $g'$ may be of any suitable description of rotary chuck provided with adjustable cutters rotating with the chuck and also free to turn in contact with the stone, but, as shown, are each the same as the improved chuck already described, and therefore their separate parts are not lettered. In the device for cutting the side of the stone, $f$ are the frames, in which is loosely mounted in fixed bearings the driving-shaft $f'$, provided with a suitable fast and loose pulley $f^2$ and carrying the lower chuck $g$. To the shaft $f'$ is fixed the spur-gear $f^3$, which meshes into the spur-gear $h'$, mounted upon the shaft $h$, as shown. The shaft $h$ has bearings within brackets $h^2$. To one end of the shaft $h$ is attached a chuck $g'$. The brackets $h^2$ are made adjustable upon a portion of the frames $f$, made concentric with the shaft $f'$ by means of cap-screw bolts $h^3$, passing through slots $h^4$ in the brackets, and, with the brackets $h^2$, the shaft $h$, and its chuck $g'$, are adjustable concentrically with the shaft $f'$. The shaft $h$ is provided with a collar $h^5$ on each side of the frame, as shown, which collar is provided with suitable set-screws $h^6$ to set the collar upon the shaft, so as to admit of longitudinal adjustment of the shaft and its chuck $g'$ and to hold them in their adjusted position. The gear $f^3$ may be made with sufficient breadth of face to allow the gear $h'$ and with it the chuck $g'$ and its shaft to be adjusted lengthwise, as shown; but, if preferred, the gear $h'$ may be made adjustable upon the shaft $h$ by means of a suitable set-screw on the shaft (shown at $h^7$) and a spline. (Not shown.)

The bed $a$ of the machine is provided with tracks $a^3$, upon which is a movable table $i$. The table $i$ is provided with tracks $i'$, arranged at right angles to the tracks $a^3$, upon which is movable another table $k$, upon which latter table is mounted a turn-table $l$, upon which the stone is placed, whereby the stone is moved, as required, in order to be acted upon by the cutting devices.

I claim—

1. In a machine for cutting and dressing stone, a chuck provided with means to positively rotate it, thereby positively rotating its cutters jointly, said chuck being adjustable, thereby adjusting its cutters jointly to the inclination required to cut a desired molding by means adapted to swing said chuck, substantially as described, said cutters also being adjustable severally and severally free to turn in contact with the stone.

2. In a machine for cutting and dressing stone, the combination, with the movable plate $b'$, of a telescopic brace pivotally attached to the frame $a'$ and to the movable plate $b'$, consisting of a rod $c^2$, and a tubular portion $c$, provided with a clamping-plate $c^4$, and a set-screw $c^5$ to rigidly clamp the rod and tubular portion together, substantially as described, for the purpose specified.

3. In a stone-cutting chuck provided with means to positively rotate it, thereby positively rotating its cutters jointly, said cutters also being severally free to turn in contact with the stone, and a cutter-head provided with an arm rigidly united with it and adjustable by means of devices bearing upon said arm, said arm serving also to keep the axis of the cutter carried by the cutter-head at an angle to the axis of the chuck, substantially as described.

4. In a machine for cutting and dressing stone, the combination of two chucks provided with means to positively rotate them oppositely, thereby positively rotating oppositely the cutters of each chuck jointly, one of said chucks being adjustable concentrically with the other chuck, thereby adjusting its cutters jointly and concentrically with said other chuck, substantially as described, the cutters of both of said chucks also being adjustable severally and severally free to turn in contact with the stone.

5. In a machine for cutting and dressing stone, the combination of two chucks provided with means to positively rotate them oppositely, thereby positively rotating oppositely the cutters of each chuck jointly, one of said chucks being adjustable endwise in its bearings in a line parallel with the length of the shaft of the other chuck and into a cutting plane parallel to that of said other chuck, substantially as described, the cutters of both of said chucks also being adjustable severally and severally free to turn in contact with the stone.

ALEXANDER McDONALD.

Witnesses:
WALDRON BATES,
WM. S. ROGERS.